G. H. WITSAMAN.
TIRE MOLD.
APPLICATION FILED OCT. 13, 1919.
1,373,389.
Patented Mar. 29, 1921.
2 SHEETS—SHEET 1.
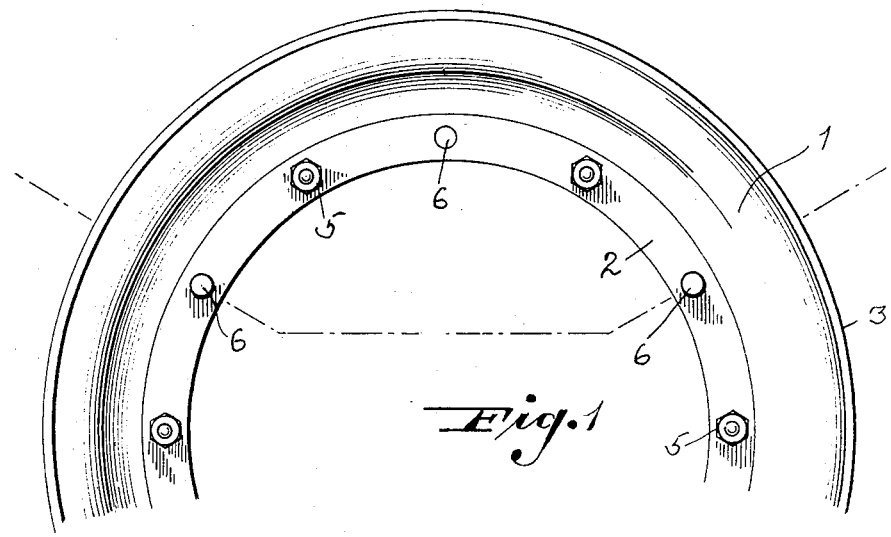
Fig. 1
Fig. 2
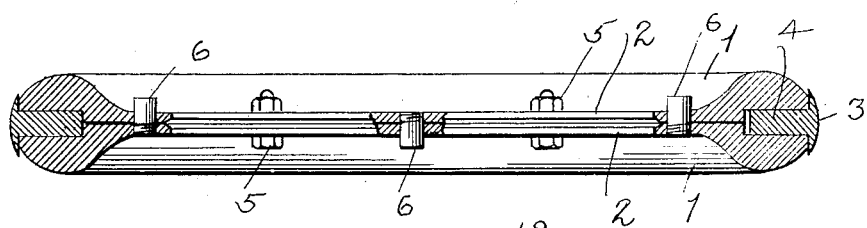
Fig. 3
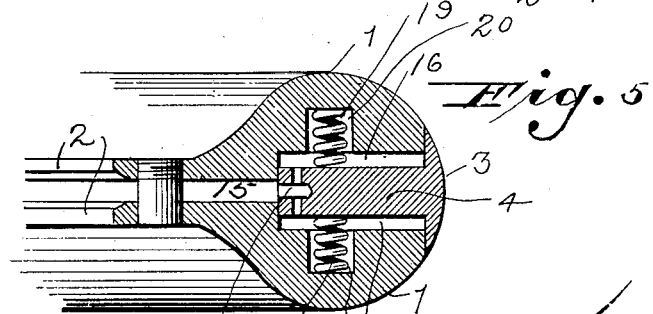
Inventor
George H. Witsaman
By F. L. Walker
Attorney

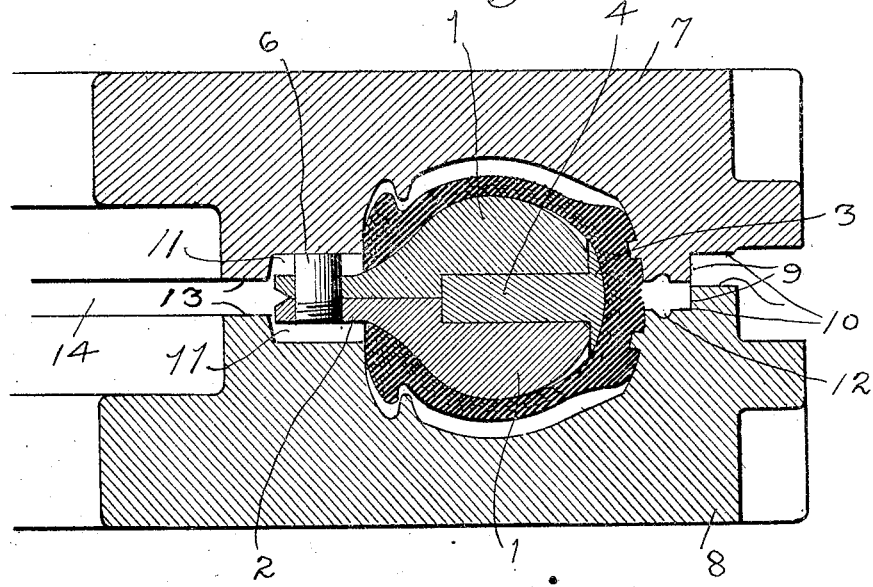
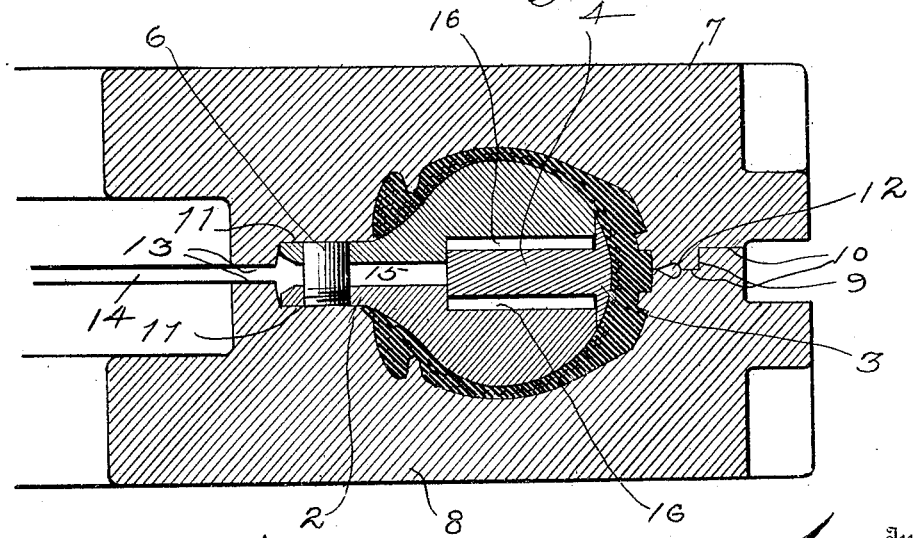

UNITED STATES PATENT OFFICE.

GEORGE H. WITSAMAN, OF DAYTON, OHIO, ASSIGNOR OF ONE-HALF TO WILLIAM B. RUSTON, OF DAYTON, OHIO.

TIRE-MOLD.

1,373,389.  Specification of Letters Patent.  Patented Mar. 29, 1921.

Application filed October 13, 1919. Serial No. 330,327.

*To all whom it may concern:*

Be it known that I, GEORGE H. WITSAMAN, a citizen of the United States, residing at Dayton, in the county of Montgomery and State of Ohio, have invented certain new and useful Improvements in Tire-Molds, of which the following is a specification.

My invention relates to the manufacture of pneumatic vehicle tires and more particularly to a mechanically operated expanding core therefor, and the herein described process of producing pneumatic tires with the aid of such core.

The object of the invention is to simplify the apparatus as well as the means and mode of operation, in the production of pneumatic tires, whereby they will not only be cheapened in manufacture, but will be more uniformly and accurately shaped, of equalized tension, more efficient in use, of greater durability, and less susceptible to injury.

A further primary object of the invention is to provide an expanding mandrel or core about which the tire is built, with means for positively expanding the mandrel or core within the tire mold, whereby the tire is subjected to pressure both from the inside and outside as the mold is closed.

A further object of the invention is to provide means for automatically expanding the core or mandrel in unison with and proportionately to the closing movement of the tire mold.

A further object of the invention is to enable the heating of the tire from the inside during the curing process by enabling the admission of heated steam to the interior of the core or mandrel.

With the above primary and other incidental objects in view as will more fully appear in the specification, the invention consists of the features of construction, the parts and combinations thereof, and the mode of operation or their equivalents as hereinafter described and set forth in the claims.

Referring to the drawings, Figure 1 is a plan view of a portion of the expanding tire core forming the subject matter hereof. Fig. 2 is a transverse sectional view substantially on line 2—2 of Fig. 1. Fig. 3 is a transverse sectional view of one side of the tire mold showing the expanding mandrel and uncured tire located therein, prior to the application of pressure. Fig. 4 is a like view subsequent to the application of pressure to the tire mold, by which the mold is closed, and the core expanded subjecting the tire to both internal and external pressures. Fig. 5 is a transverse sectional view of the expanding core embodying as modifications, automatic equalizing springs for centering the tread segment of the core and also illustrating as further modification, a steam inlet port through which heated steam is circulated within the core to facilitate the curing of the tire.

Like parts are indicated by similar characters of references throughout the several views.

In the manufacture of pneumatic vehicle tire casings or shoes of the "cord" reinforcement type, it has heretofore been the common practice to build the casing around a partially inflated air bag, utilized as the core to give the desired internal shape to the product. The tire so built, however, is of under size or slightly smaller than the desired standard, and the bag is subsequently further inflated to stretch the tire, and equalize the tension of the cord reinforcement. Such inflated air bag affords a yielding support and hence is not conducive to uniformity of the finished product. Instead of stretching and equalizing the cord reinforcement, the bag tends to yield into agreement with the tension of the tire. Furthermore, the air bags used for this purpose soon deteriorate and do not withstand many successive tire curing operations. The replacement of the air bags is expensive and materially increases the cost of production of tires.

The present form of core is designed to afford a rigid non-yielding support about which the tire casing may be built in a somewhat reduced size and subsequently expanded to the desired standard dimension within the tire mold thus subjecting the tire casing to unyielding internal pressure at contracted points until a uniform shape and tension is attained. The expanding core herein described is further adapted to successfully withstand long usage and repeated curing operations without deterioration, and is designed to admit the steam, heated air, or other vulcanizing medium to the interior of the tire casing being produced whereby the material is more uniformly and thoroughly cured. The expanding mandrel or core comprises two annular lateral or side segments 1—1 each having an inward extending flange 2, and an annular peripheral or tread segment 3 having an inward extending tongue or flange 4 projecting intermediate the lateral or side segments 1. The lateral or side segments 1 are recessed or rabbeted on their inner sides to accommodate the inward projecting flange 4 of the tread or peripheral segment 3. The transverse outline of the lateral or side segments 1 and the peripheral or tread segment 3 is such that when the core is expanded as shown in Figs. 4 and 5, these surfaces will agree or register one with the other to form a continuous circular cross sectional contour. However, when the core is collapsed or contracted during the process of building the tire thereon, the lateral edges of the tread or peripheral segment will somewhat overhang the lateral or side segments 1 as shown in Figs. 2 and 3. It is to be understood that each of the segments 1 and 3 is continuous throughout the entire circle of the tire, thus comprising an annular member one of which is positioned between the remaining two.

During the process of building the tire upon the core, the internal flanges 2 contact one upon the other, and at the same time the interior rabbeted faces of the side or lateral segments 1 contact the internal flange 4 of the tread or peripheral segment. The core is held in this contracted condition by means of bolts 5 located at intervals throughout the flanges 2. Each of the flanges 2 is further provided with a series of studs 6, fixedly mounted therein and projecting through registering holes in the opposing flange 2. The studs 6 are arranged in alternating series as illustrated in Fig. 2, that is to say, the successive studs project in opposite direction from each flange 2 through the opposite flange to a point somewhat beyond the outer face thereof. The green or uncured tire built about the exterior of the collapsed core or mandrel is of less internal diameter than that of the finished product. The collapsed core and the uncured tire or casing thereon, is then inserted in the matrix or tire mold which is recessed to agree with the exterior of the finished tire. This matrix or mold is formed in two opposing members 7 and 8 having interlocking shoulders 9 which insure the accurate registration of the mold or matrix members while the contact faces 10 serve as stops to limit the approach of the matrices, thus insuring the proper size and shape of the finished product. In addition to being recessed to agree with the exterior contour of the tire, each matrix is rabbeted at 11 to accommodate the inward projecting core flanges 2. Before inserting the core carrying the green or uncured tire within the matrix or mold, the attachment bolts 5, which are of temporary use, while building the tire, are removed. Being inserted within the matrix or mold as shown in Fig. 3, the studs 6 carried by the uppermost flange rest on the rabbet 11 of the lower matrix or mold member. At the same time the upper matrix or mold member engages and bears upon the upturned studs 6, which are supported in the lowermost flange 2 and project through the upper flange of the core. It is customary to stack these tire molds one upon another and to apply pressure thereto by means of a hydraulic press or ram, and while subjected to such pressure to circulate superheated steam around the mold heating the mold to a high degree to vulcanize or cure the tire inclosed therein.

It will be obvious that upon the approach of the matrix or mold members 7 and 8, the alternating studs 6 are pressed in opposite direction. By this action the lowermost side or lateral segment 1 (Fig. 3) is pressed downward by the engagement of the uppermost matrix member 7 with the ends of the studs 6 carried by the lower flange 2, while at the same time the upper side or lateral segment 1 is pressed upward by the engagement of the lower matrix or mold member 8 with the ends of the studs 6 carried by the upper flange 2. The segments 1 and 2 are thus separated one from the other and caused to stretch the green or uncured tire and equalize the tension of the reinforcement strands. The initial stretching or equalizing of the reinforcement cords occurs before the matrices or mold members engage the exterior of the tire with any considerable degree of pressure. This is due to the fact that at the beginning of the operation, the matrices are separated one from the other a considerable distance. After engaging the exterior of the green or uncured tire, the mold continues to close and the core further expands in unison therewith until the tire is stretched to standard gage. During the final operation the matrices contract upon the tire and the core expands in unison with substantially equal pressure thus compressing the walls of the tire by simultaneous internal and external pressure. During this adjusting movement of the segments 1 the peripheral segment 3 remains substantially stationary under the influence of the pressure of the tire material, while the segments 1 draw away from the internal flange 4. As the matrices approach the limit of their movement any excess material is squeezed out of the mold cavity into the overflow chamber or groove 12, which is usually found in such molds, and is pinched off as the mold or matrix members come together. At the limit of their movement the matrices or mold members 7 and 8 bear firmly upon outer faces of the flanges 2 and thereby obviate any tilting or skew position of the core members. The relation of the inner faces of the mold or matrix member at the inner side thereof and beyond the rabbets 11 is such that when the mold is closed these faces 13 are slightly separated to form a slot or passage 14 communicating with the intermediate space 15 between the core segments 1, into which the live steam may enter for the purpose of heating the core and supplying vulcanizing heat to the interior of the tire. If so desired the internal flange 4 of the tread or peripheral segment 3 may be slightly shorter than the rabbet or recess in the inner face of the side segment 1 as shown at the right in Fig. 2, thus affording a passage for the live steam to the intermediate space 16 at either side of the flange 4 when the core is expanded. In lieu of shortening the flange 4, as just mentioned, the flange may be provided with a series of ports 18 having lateral outlets leading from the space 15 to the spaces 16 as shown in Fig. 5. These constructions insure a wider circulation and a uniform application of the vulcanizing heat to the interior of the tire as well as to the exterior thereof.

While under ordinary conditions the pressure of the green or uncured tire upon the tread or peripheral segment 3 will be found sufficient to maintain this segment in its central position, during the expansion or adjustment of the core in order to insure the centering of this segment in proper relation with the outwardly adjusted side segments 1, a series of equalizing springs 19 may be provided as shown in Fig. 5. These equalizing springs are seated in recesses or sockets 20 in the inner faces of the lateral segments 1 and bear in opposite directions upon the lateral faces of the internal flange 4 of the said segment 3. The springs 19 being of like tension will balance one against the other and so tend to hold the tread or peripheral segment stationary while the side or lateral segments are being adjusted outwardly.

It will be obvious that the core and matrix coact one with the other to afford an initial expansion of the tire and subsequently a uniform balanced pressure upon all parts of the tire That is to say the final pressure outward upon the interior of the tire equals the exterior pressure, and that the variation of the matrices varies the core elements in unison, and that furthermore, during the curing process the tire receives heat from both the interior and exterior thereof.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims..

Having thus described my invention, I claim:

1. In a tire mold, an expansible core, comprising a plurality of independent annular sections and a contractible matrix, and means whereby the annular sections are laterally separated and the matrix contracted in unison.

2. In a tire mold, an expansible core, comprising a plurality of independent annular sections, a contractible matrix, and means for laterally separating the annular sections by the contraction of the matrix.

3. In a tire mold, an expansible core peripherally divided into separable sections and a contractible matrix, and means whereby the initial contraction of the matrix will separate the core sections to subject the tire to internal pressure independent of external pressure and the further contraction of the matrix will further expand the core to increase the internal pressure simultaneously with the application of external pressure by said matrix.

4. In an expansible tire core, two substantially parallel annular members, studs carried by each member and projecting beyond the face of the other member and means for applying pressure to the studs to separate said members.

5. In an expanding tire core, two annular side members, and an annular tread member, said side members being relatively movable to and from each other independent of the tread member.

6. An expansible tire core comprising two substantially parallel annular members having convex oppositely disposed lateral faces, and an annular peripheral member having a convex circumferential face, and means by which the first mentioned members are separated one from the other independent of the peripheral member.

7. In a tire mold, a core including a plurality of relatively movable nonyielding sections initially seated one on another to form a solid core, and means for subsequently separating the nonyielding sections to afford a passage for the circulation of heated medium.

8. A sectional tire core comprsing two annular lateral sections and an annular peripheral section, and means whereby said sections are laterally movable in relation one with another.

9. A sectional tire core comprising two annular lateral sections and a perpiheral section extending intermediate the lateral sections, said sections being laterally separable into spaced relation while within the tire, substantially as specified.

10. An expanding core comprising two parallel annular members having convex lateral faces, an annular member of substantially T-shaped cross section having a convex peripheral face located between the first mentioned members and overhanging the peripheries thereof, and means to separate said members.

11. A tire core divided peripherally into a plurality of relatively movable sections, and means to effect the lateral separation of said sections into spaced relation one with the other while within the tire.

12. A tire mold comprising a matrix and a core, the core and matrix being both peripherally divided into a plurality of sections and means whereby the approach of the matrix sections effects a separation of the core sections, substantially as specified.

13. A tire mold comprising a matrix and a core each divided peripherally into relatively movable sections, each section of the matrix engaging and moving in unison the opposite section of the core.

14. An expanding core for tires, comprising relatively movable independent annular members, oppositely disposed projections carried by each member extending beyond the opposite member, and means for applying pressure to said projections to effect a separation of the members.

In testimony whereof, I have hereunto set my hand this 3rd day of October A. D. 1919.

GEORGE H. WITSAMAN.

Witness:
WILLIAM A. SWANEY.